(12) United States Patent
Tabata et al.

(10) Patent No.: US 12,315,314 B2
(45) Date of Patent: May 27, 2025

(54) VEHICLE COMPONENT SELECTION METHOD

(71) Applicant: TOYOTA JIDOSHA KABUSHIKI KAISHA, Toyota (JP)

(72) Inventors: Atsushi Tabata, Okazaki (JP); Ken Imamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 627 days.

(21) Appl. No.: 17/747,247

(22) Filed: May 18, 2022

(65) Prior Publication Data

US 2022/0383675 A1 Dec. 1, 2022

(30) Foreign Application Priority Data

May 26, 2021 (JP) ................. 2021-088488

(51) Int. Cl.
*G07C 5/08* (2006.01)
*G06Q 10/0875* (2023.01)
*H04B 1/08* (2006.01)

(52) U.S. Cl.
CPC ....... *G07C 5/0833* (2013.01); *G06Q 10/0875* (2013.01); *H04B 1/082* (2013.01)

(58) Field of Classification Search
CPC . G07C 5/0833; G06Q 10/0875; B60W 50/12; B60W 40/09; B60W 2510/106; B60W 2540/30; B60R 16/037; B60R 16/0231; G06N 20/00; H04B 1/082
USPC .............................................. 381/86; 700/94
See application file for complete search history.

(56) References Cited

U.S. PATENT DOCUMENTS

| | | | |
|---|---|---|---|
| 8,155,343 B2* | 4/2012 | Honji | G10K 15/04 381/86 |
| 8,885,845 B2* | 11/2014 | Honji | G10K 15/04 381/86 |
| 11,415,217 B2* | 8/2022 | Fujii | B60W 50/14 |
| 11,566,966 B2* | 1/2023 | Tabata | G01M 7/00 |
| 12,014,585 B2* | 6/2024 | Tabata | G01M 7/00 |
| 2013/0177167 A1* | 7/2013 | Takahashi | B60Q 5/008 381/86 |

(Continued)

FOREIGN PATENT DOCUMENTS

JP 2020-060288 A 4/2020

*Primary Examiner* — Xu Mei
(74) *Attorney, Agent, or Firm* — Oliff PLC

(57) ABSTRACT

A plurality of driving force transmitting components of the same kind is categorized into a plurality of groups depending on a frequency range with the loudest operation sound. A component selection device stores mapping data that is data that defines mapping learned by machine learning. When the user-related information is input as an input variable, the mapping outputs a value corresponding to the input variable as an output variable. The vehicle component selection method causes the component selection method to execute: an input process inputting the user-related information into the mapping as the input variable; a selection process selecting the group corresponding to the output variable output by the mapping from the groups; and a determination process determining the driving force transmitting component categorized into the group selected in the selection process as a component to be installed in the vehicle for the user identified by the user-related information.

6 Claims, 6 Drawing Sheets

(56) References Cited

U.S. PATENT DOCUMENTS

| | | | |
|---|---|---|---|
| 2021/0366210 A1* | 11/2021 | Okuda | G07C 5/006 |
| 2022/0198845 A1* | 6/2022 | Tabata | G07C 5/0841 |
| 2022/0199107 A1* | 6/2022 | Ueda | G07C 5/0808 |

* cited by examiner

FIG. 1
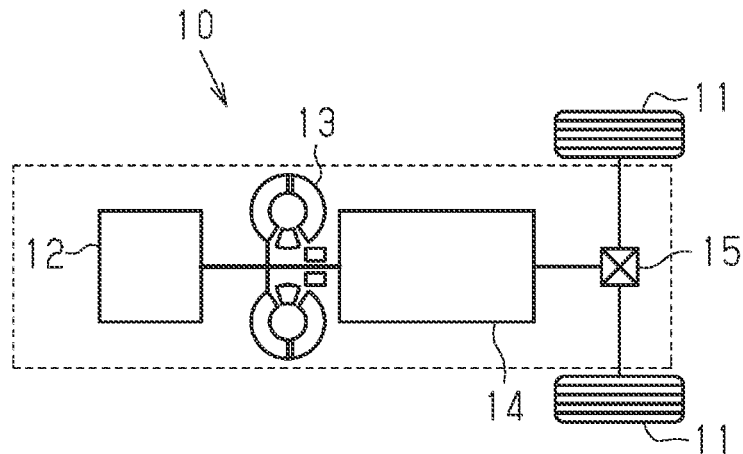
FIG. 2
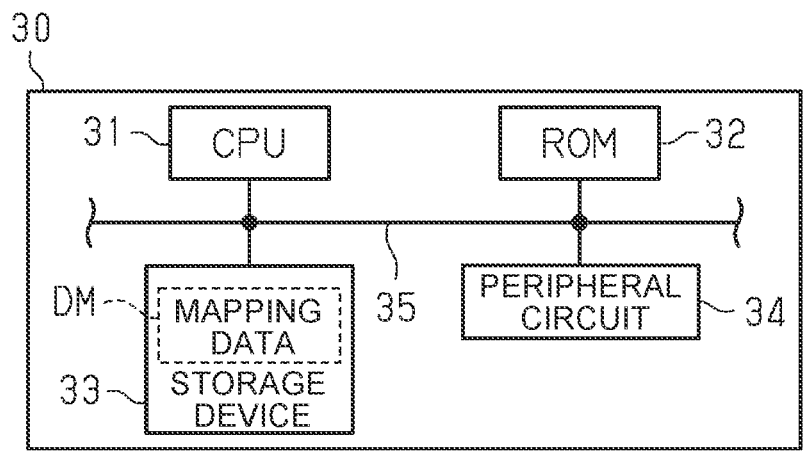
FIG. 3
| | FREQUENCY RANGE IN WHICH OPERATION SOUND IS MAXIMUM |
|---|---|
| Gr1 | HIGH FREQUENCY RANGE |
| Gr2 | MIDDLE FREQUENCY RANGE |
| Gr3 | LOW FREQUENCY RANGE |

FIG. 7

|    | AGE | RACE | NATIONALITY | RESIDENTIAL AREA |
|----|-----|------|-------------|------------------|
| HA | 25  | XX   | COUNTRY A   | STATE B1         |
| HB | 65  | YY   | COUNTRY A   | STATE B2         |
| HC | 53  | XZ   | COUNTRY B   | PREFECTURE B3    |
| HD | 38  | XX   | COUNTRY C   | PROVINCE B4      |

FIG. 8

| TESTER | THIRD VEHICLE LOW FREQUENCY RANGE | SECOND VEHICLE MIDDLE FREQUENCY RANGE | FIRST VEHICLE HIGH FREQUENCY RANGE | OPTIMAL FREQUENCY RANGE |
|--------|-----|-----|-----|------------------------|
| HA | ○ | △ | × | LOW FREQUENCY RANGE |
| HB | × | △ | ○ | HIGH FREQUENCY RANGE |
| HC | △ | △ | ○ | HIGH FREQUENCY RANGE |
| HD | △ | ○ | × | MIDDLE FREQUENCY RANGE |

FIG. 9

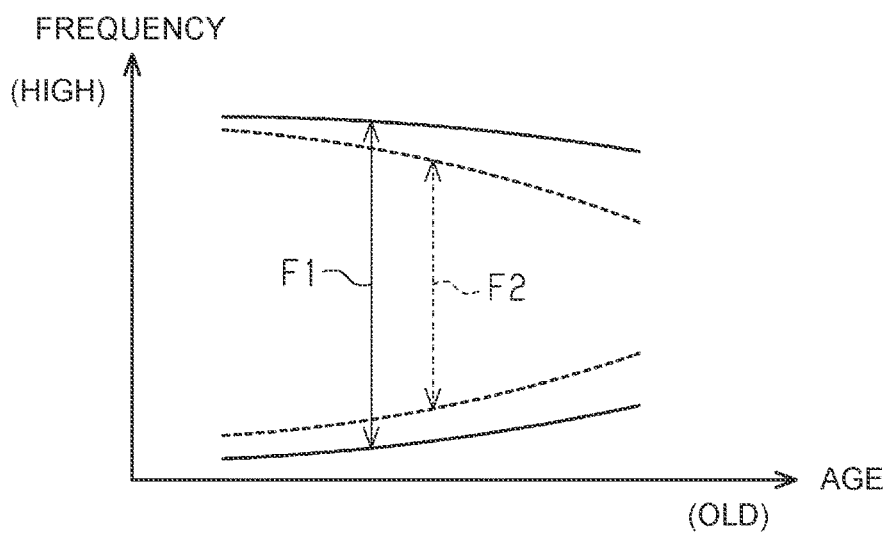

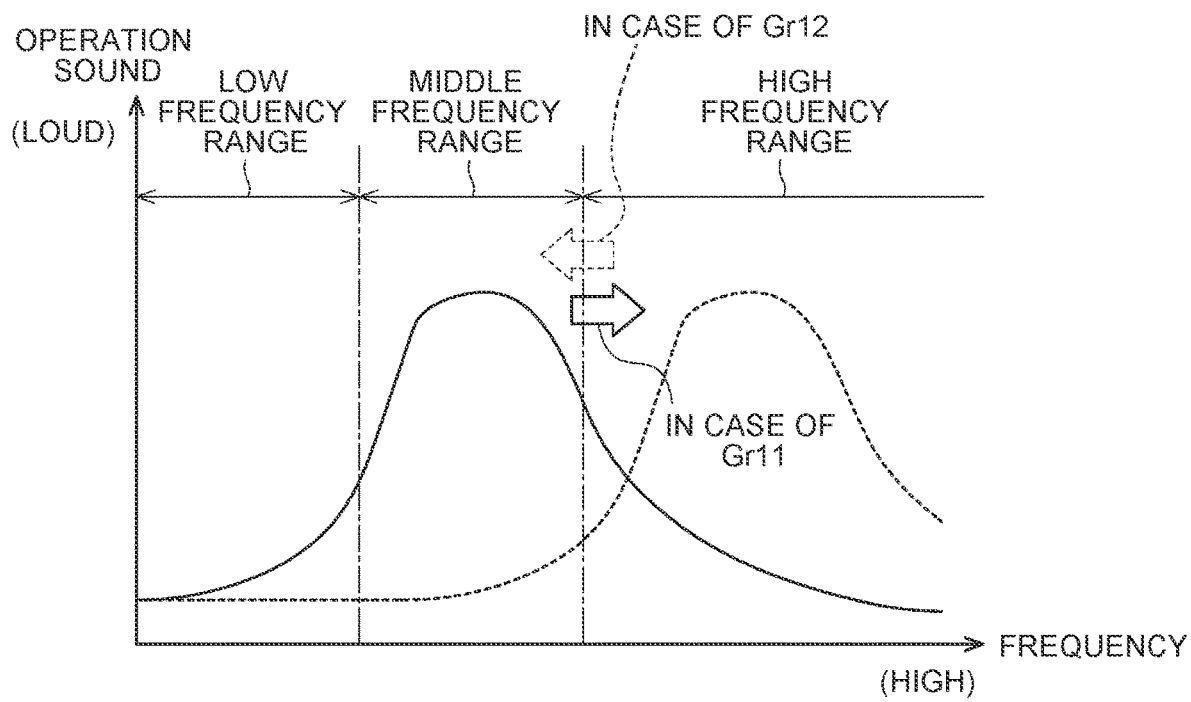

|  | AGE | RACE | NATIONALITY | RESIDENTIAL AREA | MAJOR VEHICLE SPEED REGION |
|---|---|---|---|---|---|
| HA | 25 | XX | COUNTRY A | STATE B1 | Fsp1 |
| HB | 65 | YY | COUNTRY A | STATE B2 | Fsp2 |
| HC | 53 | XZ | COUNTRY B | PREFECTURE B3 | Fsp3 |
| HD | 38 | XX | COUNTRY C | PROVINCE B4 | Fsp4 |

VEHICLE COMPONENT SELECTION METHOD

CROSS-REFERENCE TO RELATED APPLICATION

This application claims priority to Japanese Patent Application No. 2021-088488 filed on May 26, 2021, incorporated herein by reference in its entirety.

BACKGROUND

1. Technical Field

The present disclosure relates to a vehicle component selection method.

2. Description of Related Art

Japanese Unexamined Patent Application Publication No. 2020-60288 (JP 2020-60288 A) describes an example of a driving force transmitting component arranged in a power transmission path from a power source to drive wheels of a vehicle. This driving force transmitting component has a planetary gear mechanism.

SUMMARY

The driving force transmitting component as described above has been devised in various ways so that a magnitude of an operation sound that is a sound generated when the driving force transmitting component is operated is within an allowable range set by a vehicle manufacturer. However, it is inevitable that a sound is generated during operation, and a sound within an allowable range is generated.

Among users of the vehicle, there are users who are sensitive to the sound of a specific frequency range and feel uncomfortable about it. Moreover, even among such users, the frequency range of uncomfortable sounds differs from person to person. That is, some users are sensitive to a sound in a first frequency range, while others are sensitive to a sound in a second frequency range.

Members that configure the driving force transmitting component are varied in shape and size. Further, when assembling the driving force transmitting component, an error occurs when assembling each member. As a result, among a plurality of the driving force transmitting components of the same model, although the operation sound in the first frequency range is louder than the operation sound in the second frequency range in a certain driving force transmitting component, there are cases in which the operation sound in the second frequency range is louder than the operation sound in the first frequency range in another driving force transmitting component.

For example, it is assumed that a user who is sensitive to the sound of the first frequency range is referred to as a first user, and for example, a user who is sensitive to the sound of the second frequency range is referred to as a second user. When the first user gets on a vehicle equipped with a driving force transmitting component in which the operation sound of the first frequency range is louder, the first user tends to feel uncomfortable about the operation sound of the driving force transmitting component. In contrast, when the first user gets on a vehicle equipped with a driving force transmitting component in which the operation sound of the second frequency range is louder, the first user hardly feels uncomfortable about the operation sound of the driving force transmitting component.

On the contrary, when the second user gets on the vehicle equipped with the driving force transmitting component in which the operation sound of the first frequency range is louder, the second user hardly feels uncomfortable about the operation sound of the driving force transmitting component. In contrast, when the second user gets on the vehicle equipped with the driving force transmitting component in which the operation sound of the second frequency range is louder, the second user tends to feel uncomfortable about the operation sound of the driving force transmitting component.

That is, even when the driving force transmitting component that is manufactured so that the loudness of the operation sound does not exceed the allowable range is installed in the vehicle, the user may feel uncomfortable about the operation sound of the driving force transmitting component depending on the combination of the user and the driving force transmitting component.

A vehicle component selection method for solving the above problem is a method of selecting a driving force transmitting component to be installed in a vehicle. The driving force transmitting component is arranged in a power transmission path from a power source of the vehicle to drive wheels. A plurality of the driving force transmitting components of the same kind is categorized into a plurality of groups in accordance with a frequency range in which an operation sound is the loudest. A component selection device stores mapping data that is data that defines mapping learned by machine learning. The mapping uses, as an input variable, user-related information that is information regarding a user, and when the input variable is input, the mapping outputs a value corresponding to the input variable as an output variable. The output variable is a value that identifies a group in which the driving force transmitting component is categorized among the groups, the driving force transmitting component having a characteristic in which an operation sound of another frequency range is louder than an operation sound of a frequency range that the user identified by the user-related information feels most uncomfortable about. In this vehicle component selection method, the component selection device is caused to execute an input process that inputs the user-related information into the mapping as the input variable, a selection process that selects the group corresponding to the output variable output by the mapping from the groups, and a determination process that determines the driving force transmitting component categorized into the group selected in the selection process as a component to be installed in the vehicle for the user identified by the user-related information.

When manufacturing a large number of driving force transmitting components of the same kind, a plurality of driving force transmitting components having different relationships between the loudness of the operation sound and the frequency are manufactured. This occurs due to variations in the size and shape of the members that configure the driving force transmitting component, assembly errors of the members, and the like.

In the above configuration, these driving force transmitting components are categorized into a plurality of groups in accordance with the frequency range in which the operation sound is the loudest. Then, when determining the driving force transmitting component to be installed in the vehicle, user-related information is input to the mapping as an input variable. The mapping outputs a value corresponding to the input user-related information as an output variable. Then, the group corresponding to the output variable is selected from the groups. The selected group is a group in which the driving force transmitting component having a characteristic in which the operation sound of another frequency range is louder than the loudness of the operation sound of the frequency range that the user feels most uncomfortable about. Then, the driving force transmitting component categorized into this group is determined as a component to be installed in the vehicle for the user identified by the user-related information.

That is, by using the user-related information about the user who uses the vehicle as the input variable of the map, the driving force transmitting component in which the operation sound of the frequency range that the user feels uncomfortable about is less likely to be loud can be installed in the vehicle. As a result, it is possible to suppress the user from feeling uncomfortable about the operation sound of the driving force transmitting component in the market.

In one aspect of the vehicle component selection method, the user-related information includes at least one of information regarding an age of the user, information regarding a race, and information regarding an area where the user resides. In the input process, the user-related information is input to the mapping.

Depending on the age, the frequency range of the sound the user feels sensitive about may differ, and it may become difficult to hear the high frequency range due to aging. In addition, the frequency range of the sound the user feels sensitive about differs depending on the race. Further, depending on the area where the user resides, there may be more users who complain excessively that they feel uncomfortable about sounds in a specific frequency range as compared with other areas. In the above configuration, the user-related information that includes at least one of information regarding an age of the user, information regarding a race, and information regarding an area where the user resides is input the mapping as the input variable. In this case, the mapping outputs a value reflecting at least one of the age of the user, the race, and the area where the user resides as the output variable. The group corresponding to the output variable is selected from the groups. Then, the driving force transmitting component categorized into the selected group is selected as the component to be installed in the vehicle. As a result, the driving force transmitting component in which the operation sound of the frequency range that the user identified by the user-related information feels uncomfortable about is less likely to be loud can be installed in the vehicle.

In one aspect of the vehicle component selection method described above, machine learning is performed for the mapping by using the user-related information and information regarding the group in which the driving force transmitting component is categorized, the driving force transmitting component having a characteristic in which an operation sound of a frequency range that the user identified by the user-related information does not feel uncomfortable about is louder than the operation sound of another frequency range. In the input process, the user-related information is input to the mapping.

When machine learning is performed for the mapping, in addition to the user-related information, information regarding the group in which the driving force transmitting component is categorized is used, the driving force transmitting component having a characteristic in which an operation sound of a frequency range that the user identified by the user-related information does not feel uncomfortable about is louder than the operation sound in the other frequency range. As a result, in mapping, when the user-related information is input as the input variable, a value that identifies the group in which the driving force transmitting component having the characteristic in which the operation sound of the frequency range the user does not feel uncomfortable about is louder than the operation sound of the other frequency range is categorized can be output as the output variable.

In the above configuration, the user-related information is input for such a mapping. Then, the mapping outputs a value in consideration of the frequency of the sound that the user identified by the user-related information does not feel uncomfortable about as the output variable. Then, the driving force transmitting component categorized into the group corresponding to the output variable is determined as the component to be installed in the vehicle. Thus, according to the configuration described above, the driving force transmitting component in which the operation sound of the frequency range that the user identified by the user-related information feels uncomfortable about is less likely to be loud can be installed in the vehicle.

In one aspect of the vehicle component selection method described above, machine learning is performed for the mapping by using the user-related information and information regarding the group in which the driving force transmitting component is categorized, the driving force transmitting component having a characteristic in which an operation sound of a frequency range that the user identified by the user-related information has difficulty hearing is louder than the operation sound of another frequency range. In the input process, the user-related information is input to the mapping.

When machine learning is performed for the mapping, in addition to the user-related information, information regarding the group in which the driving force transmitting component is categorized is used, the driving force transmitting component having a characteristic in which an operation sound of a frequency range that the user identified by the user-related information has difficulty hearing is louder than the operation sound in the other frequency range. As a result, in mapping, when the user-related information is input as the input variable, a value that identifies the group in which the driving force transmitting component having the characteristic in which the operation sound of the frequency range the user has difficulty hearing is louder than the operation sound of the other frequency range is categorized can be output as the output variable.

In the above configuration, the user-related information is input for such a mapping. Thus, the mapping outputs a value in consideration of the frequency range of the sound that is difficult for the user to hear as the output variable. Then, the driving force transmitting component categorized into the group corresponding to the output variable is determined as the component to be installed in the vehicle. As a result, the driving force transmitting component in which the operation sound of the other frequency range described above that the user can relatively easily hear is less likely to be loud can be installed in the vehicle.

In one aspect of the vehicle component selection method described above, among the groups, in the driving force transmitting component categorized into a first group, when a traveling time of the vehicle exceeds a first specified time, an operation sound of a first frequency range is louder than when the traveling time is less than or equal to the first specified time, and an operation sound of a second frequency range is smaller than when the traveling time is less than or equal to the first specified time. In the driving force transmitting component categorized into a second group, when the traveling time of the vehicle exceeds a second specified time, the operation sound of the second frequency range is louder than when the traveling time is less than or equal to the second specified time, and the operation sound of the first frequency range is smaller than when the traveling time is less than or equal to the second specified time. The user-related information includes at least one of information regarding an age of the user, information regarding a race, and information regarding an area where the user resides, and includes information regarding an estimated value of a traveling time of the vehicle of the user. In the input process, the user-related information is input to the mapping.

When the traveling time of the vehicle changes, the temperature of the fluid such as oil in the driving force transmitting component changes, and the relationship between the operation sound and the frequency in the driving force transmitting component may change.

In the configuration described above, the user-related information that includes at least one of the information regarding the age of the user, the information regarding the race, the information regarding the area where the user resides, and that includes the information regarding the estimated value of the traveling time of the vehicle by the user is input to the mapping as the input variable. In this case, the mapping outputs a value in consideration of at least one of the age of the user, the race, and the area where the user resides as the output variable, and in consideration of the estimation value of the traveling time of the vehicle by the user.

For example, it is assumed that the user identified by the user-related information is, for example, a user who feels that the operation sound in the first frequency range is more uncomfortable than the operation sound in the second frequency range, and whose estimated value of the traveling time of the vehicle is less than or equal to the first specified time. In this case, by inputting the user-related information in the mapping, there is a possibility that a value corresponding to the first group is output from the mapping as the output variable. When the value corresponding to the first group is output from the mapping as the output variable, the driving force transmitting component that is categorized into the first group can be determined as a component to be installed in the vehicle.

Thus, according to the above configuration, by considering the traveling time of the vehicle when the user identified by the user-related information uses the vehicle, it is possible to suppress the user from feeling uncomfortable about the operation sound of the driving force transmitting component when the vehicle is used.

In one aspect of the vehicle component selection method, among the groups, in the driving force transmitting component categorized into a first group, when a vehicle speed is higher than a first specified vehicle speed, an operation sound of a first frequency range is louder than when the vehicle speed is less than or equal to the first specified vehicle speed, and an operation sound of a second frequency range is smaller than when the vehicle speed is less than or equal to the first specified vehicle speed. In the driving force transmitting component categorized into a second group, when the vehicle speed is lower than or equal to a second specified vehicle speed, the operation sound of the second frequency range is louder than when the vehicle speed is higher than the second specified vehicle speed, and the operation sound of the first frequency range is smaller than when the vehicle speed is less than or equal to the second specified vehicle speed. The user-related information includes at least one of information regarding an age of the user, information regarding a race, and information regarding an area where the user resides, and includes information regarding an estimated value of a vehicle speed range most used when the user uses the vehicle. In the input process, the user-related information is input to the mapping.

An operation mode of the driving force transmitting component changes depending on the vehicle speed of the vehicle. When the operation mode changes, the relationship between the operation sound and the frequency in the driving force transmitting component may change.

In the configuration described above, the user-related information that includes at least one of the information regarding the age of the user, the information regarding the race, the information regarding the area where the user resides, and that includes the information regarding the estimated value of the vehicle speed range that is most used when the user uses the vehicle is input to the mapping as the input variable. In this case, the mapping outputs a value in consideration of at least one of the age of the user, the race, and the area in which the user resides, and in consideration of the estimated value of the vehicle speed range most used when the user uses the vehicle as the output variable.

For example, it is assumed that the user identified by the user-related information is, for example, a user who feels that the operation sound in the first frequency range is more uncomfortable than the operation sound in the second frequency range, and whose estimated value of the vehicle speed range most used when the user uses the vehicle is less than or equal to the first specified vehicle speed. In this case, by inputting the user-related information in the mapping, there is a possibility that a value corresponding to the first group is output from the mapping as the output variable. When the value corresponding to the first group is output from the mapping as the output variable, the driving force transmitting component that is categorized into the first group can be determined as a component to be installed in the vehicle.

Therefore, according to the above configuration, by considering the range of the vehicle speed often used when the user identified by the user-related information uses the vehicle, it is possible to suppress the user from feeling uncomfortable about the operation sound of the driving force transmitting component when the user uses the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 is a schematic view showing a vehicle equipped with a transmission device selected by a component selection method of a first embodiment;

FIG. 2 is a block diagram showing a component selection device that executes each process of the component selection method;

FIG. 3 is a diagram showing a plurality of groups in which a plurality of transmission devices of the same kind is categorized;

FIG. 7 is a table showing information regarding a plurality of testers;

FIG. 8 is a table showing evaluation results by the testers;

FIG. 9 is a diagram showing a relationship between age and an audible frequency range;

FIG. 12 is a diagram showing how the relationship between the operation sound and the frequency of the transmission device changes in accordance with a traveling time of a vehicle in a third embodiment;

FIG. 13 is a table showing information regarding the testers;

DETAILED DESCRIPTION OF EMBODIMENTS

First Embodiment

Figure 4:
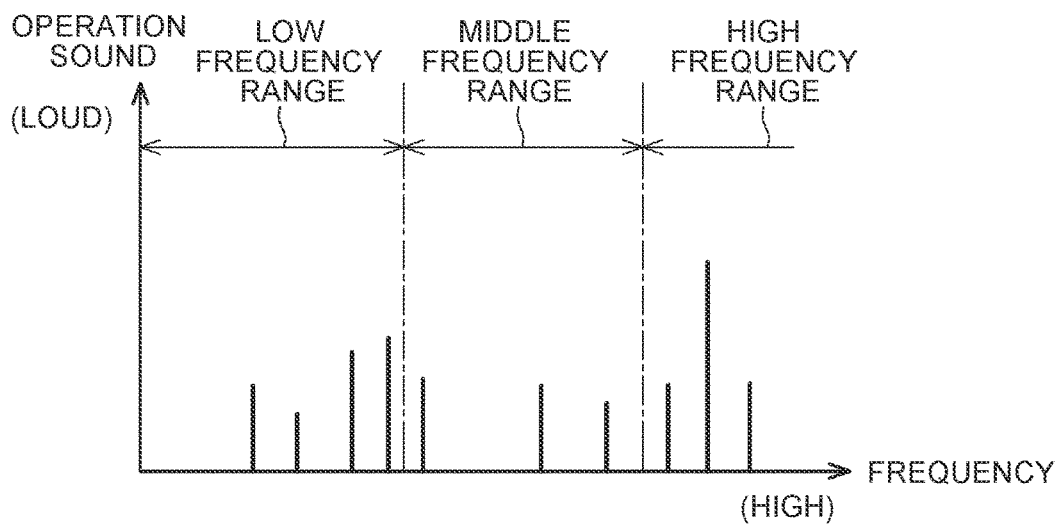
FIG. 4 is a diagram showing a relationship between an operation sound and a frequency of the transmission device in one group among a plurality of groups.

Hereinafter, a first embodiment of a vehicle component selection method will be described with reference to the drawings.

Structure of Vehicle 10

With reference to FIG. 1, a vehicle 10 equipped with a driving force transmitting component selected by the vehicle component selection method of the present embodiment will be described.

The vehicle 10 includes a power source 12 and a plurality of drive wheels 11. The power source 12 is, for example, an internal combustion engine. A torque converter 13, a transmission device 14, and a differential device 15 are provided in a power transmission path from the power source 12 to each drive wheel 11. In the present embodiment, the transmission device 14 corresponds to the "driving force transmitting component".

Component Selection Device 30

FIG. 2 illustrates a component selection device 30 that determines the transmission device 14 installed in the vehicle 10 by executing a plurality of processes of the vehicle component selection method.

The component selection device 30 includes a central processing unit (CPU) 31, a read only memory (ROM) 32, a storage device 33 that is an electrically rewritable non-volatile memory, and a peripheral circuit 34. The CPU 31, the ROM 32, the storage device 33, and the peripheral circuit 34 can communicate with each other via a local network 35. Examples of the peripheral circuit 34 can include a circuit that generates a clock signal that defines an internal operation, a power supply circuit, and a reset circuit.

The ROM 32 stores a control program executed by the CPU 31. The storage device 33 stores a mapping data DM that defines mapping learned by machine learning. That is, in the present embodiment, the mapping data DM is stored in the component selection device 30. The mapping defined by the mapping data DM uses user-related information that is information regarding a user, as an input variable. Then, when the input variable is input, the mapping outputs a value corresponding to the input variable as an output variable.

By the way, while the transmission device 14 of the same kind is manufactured in large quantities, the transmission device 14 in which the relationship between the magnitude of the operation sound and the frequency is different is manufactured. The reason why the transmission device 14 having the different relationship between the magnitude of the operation sound and the frequency is manufactured is considered to be due to the following causes (A1) and (A2).

(A1) There are variations in the size and shape of various members that configure the transmission device 14.

(A2) Assembling error of members in the process of manufacturing the transmission device 14.

Thus, in the present embodiment, a plurality of the transmission devices 14 of the same kind are categorized beforehand into a plurality of groups based on the relationship between the loudness of the operation sound and the frequency at which the operation sound is generated. The component selection device 30 selects one group corresponding to the output variable output from the mapping from the groups. Then, the component selection device 30 determines the transmission device 14 of the selected group as a component to be installed in the vehicle 10.

Each Group

In the example shown in FIG. 3, the transmission devices 14 of the same kind are categorized into three groups Gr1, Gr2, Gr3. That is, the transmission devices 14 are categorized into each group Gr1, Gr2, Gr3 in accordance with the frequency range in which the operation sound is loudest.

FIG. 4 shows an example of the relationship between the loudness and frequency of the operation sound in the transmission device 14 categorized in the group Gr1 among the groups Gr1, Gr2, Gr3. When the transmission device 14 categorized in the group Gr1 set as a first transmission device, as shown in FIGS. 3 and 4, in the first transmission, the operation sound of the high frequency range is louder than the operation sound in the other frequency ranges, that is, the operation sound of the middle frequency range and the low frequency range.

Figure 5:
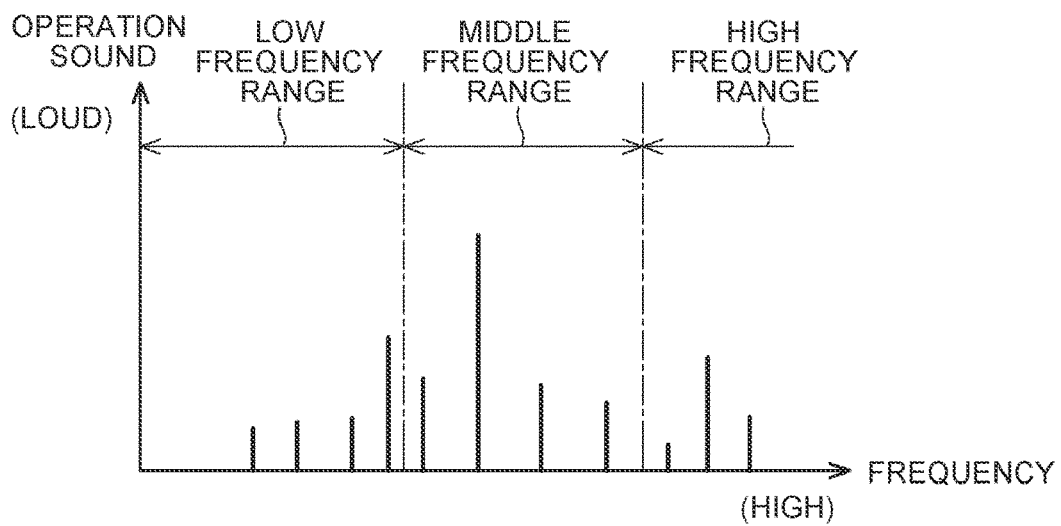
FIG. 5 is a diagram showing a relationship between the operation sound and the frequency of the transmission device in one group among the groups.

FIG. 5 shows an example of the relationship between the loudness and frequency of the operation sound in the transmission device 14 categorized in the group Gr2 among the groups Gr1, Gr2, Gr3. When the transmission device 14 categorized in the group Gr2 set as a second transmission device, as shown in FIGS. 3 and 5, in the second transmission, the operation sound of the middle frequency range is louder than the operation sound in the other frequency ranges, that is, the operation sound of the high frequency range and the low frequency range.

Figure 6:
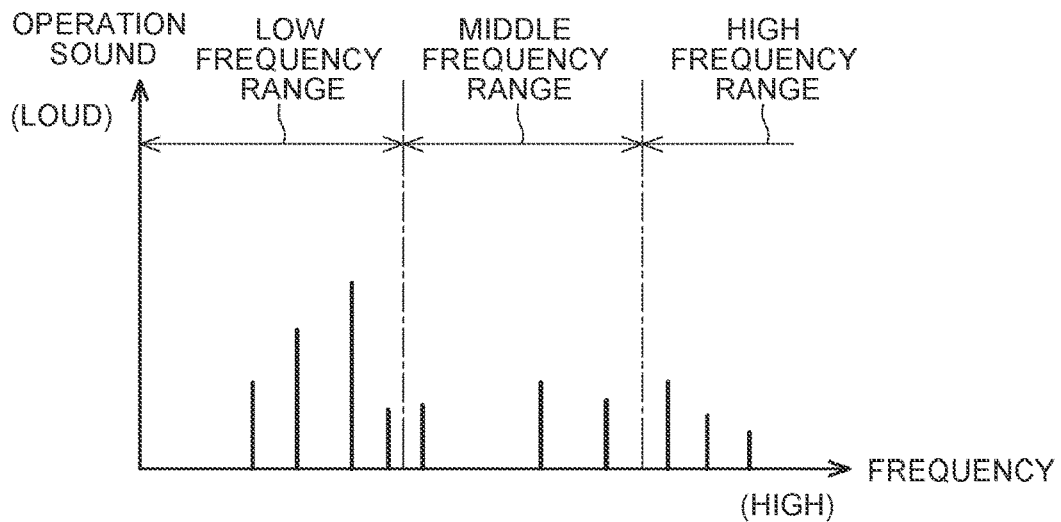
FIG. 6 is a diagram showing a relationship between the operation sound and the frequency of the transmission device in one group among the groups.

FIG. 6 shows an example of the relationship between the loudness and frequency of the operation sound in the transmission device 14 categorized in the group Gr3 among the groups Gr1, Gr2, Gr3. When the transmission device 14 categorized in the group Gr3 set as a third transmission device, as shown in FIGS. 3 and 6, in the third transmission, the operation sound of the low frequency range is louder than the operation sound in the other frequency ranges, that is, the operation sound of the high frequency range and the middle frequency range.

Mapping and Mapping Learning Method

When the user-related information is input as the input variable, a value corresponding to one group among the above groups Gr1, Gr2, Gr3 is output as the output variable. An example of such mapping is a function approximator.

Specifically, the mapping is, for example, a fully connected forward propagation type neural network having one intermediate layer.

In the present embodiment, a plurality of testers are asked to evaluate the vehicle 10 equipped with the transmission device 14 prior to learning of the mapping. That is, the vehicle 10 equipped with the transmission device 14 categorized in Group Gr1 is the first vehicle, and the vehicle 10 equipped with the transmission device 14 categorized in Group Gr2 is the second vehicle, and the vehicle 10 equipped with the transmission device 14 categorized in Group Gr3 is the third vehicle. Then, each tester is asked to evaluate the operation sound of the transmission device 14 when they get on the vehicle 10 for each vehicle.

FIG. 7 shows an example of information that can identify each tester HA, HB, HC, HD, and so on. That is, the age, the race, nationality, and residential area of each tester are shown. For example, regarding a tester HA, their age is "25 years old", their race is "XX", their nationality is "country A", and their residential area is "state B1". Regarding the tester HB, their age is "65 years old", their race is "YY", their nationality is "country A", and their residential area is "state B2".

FIG. 8 shows the evaluation results of each vehicle 10 by each tester HA, HB, HC, HD, and so on. In FIG. 8, "not uncomfortable" indicates that the tester does not feel uncomfortable about the operation sound of the transmission device 14. "Slightly uncomfortable" indicates that the tester feels slightly uncomfortable about the operation sound of the transmission device 14. "Uncomfortable" indicates that the tester feels uncomfortable about the operation sound of the transmission device 14.

For example, the tester HA does not feel uncomfortable about the operation sound of the transmission device 14 when they get on the third vehicle. The tester HA feels slightly uncomfortable about the operation sound of the transmission device 14 when they get on the second vehicle. The tester HA feels uncomfortable about the operation sound of the transmission device 14 when they get on the first vehicle. Thus, considering making it difficult for the user to feel uncomfortable about the operation sound of the transmission device 14 in the market, when the vehicle 10 for the tester HA is manufactured, it is preferable that the transmission device 14 categorized in the group Gr3 be installed in the vehicle 10.

Similarly, according to the evaluation results shown in FIG. 8, when manufacturing the vehicle 10 for the tester HB, it is preferable that the transmission device 14 categorized in the group Gr1 be installed in the vehicle 10. When manufacturing the vehicle 10 for the tester HC, it is preferable that the transmission device 14 categorized in the group Gr1 be installed in the vehicle 10. When manufacturing the vehicle 10 for the tester HD, it is preferable that the transmission device 14 categorized in the group Gr2 be installed in the vehicle 10.

Here, FIG. 9 shows the relationship between the age of each race and the audible frequency range. The audible frequency range is the range of frequencies of sound that can be perceived by humans. FIG. 9 shows the relationship between the age and the audible frequency range in the first race and the relationship between the age and the audible frequency range in the second race. That is, the audible frequency range gradually narrows as the age increases, regardless of the race. Specifically, as the age increases, the upper limit of the audible frequency range decreases and the lower limit of the audible frequency range increases.

In FIG. 9, the upper limit and the lower limit of an audible frequency range F1 in the first race are shown by solid lines. The upper limit and the lower limit of an audible frequency range F2 in the second race are shown by broken lines. That is, even if the age is the same, the width of the audible frequency range is different between the first race and the second race.

That is, the sound of a frequency that is difficult for the user to hear may change depending on the age and the race of the user. For example, the older the user, the harder it is to hear high frequency range sounds and low frequency range sounds. In addition, depending on the race of the user, there is a tendency for the frequency range of sounds that are difficult to hear. It can be said that a sound having a frequency that is difficult to hear is a sound that the user hardly feels uncomfortable about. In contrast, it can be said that a sound having a frequency that is easy to hear is a sound that the user tends to feel uncomfortable about.

In addition, market research has shown that there are different tendencies of sounds the users feel uncomfortable about in accordance with the nationalities and areas. For example, a user of a specific nationality or a user residing in a specific area may often complain about feeling uncomfortable about a sound in a specific frequency range as compared with other users.

Thus, in the machine learning of the map, information that can identify each tester shown in FIG. 7 and information related to the evaluation result of the tester shown in FIG. 8 are used. The information that can identify the tester is information that indicates the characteristics of the tester, and corresponds to "user-related information" about the tester. In the present embodiment, the user-related information includes information regarding the age of the user, information regarding the race, and information regarding the area where the user resides.

When the information regarding the evaluation result of the tester is referred to as "evaluation information", the evaluation information corresponds to information regarding the group in which the transmission device 14 having a characteristic that the operation sound in the frequency range that the user does not feel uncomfortable is louder than the operation sound in the other frequency ranges is categorized.

The evaluation information is created for each tester. For example, when the evaluation of the third vehicle is the highest, the value corresponding to the group Gr3 is used as the evaluation information. For example, when the evaluation of the second vehicle is the highest, the value corresponding to the group Gr2 is used as the evaluation information. For example, when the evaluation of the first vehicle is the highest, the value corresponding to the group Gr1 is used as the evaluation information. The "vehicle with the highest evaluation" is the vehicle that the tester does not feel uncomfortable the most about the operation sound of the transmission device 14 when riding in the vehicle 10. In this case, the evaluation information of the tester HA is a value corresponding to the group Gr3, and the evaluation information of the tester HB is a value corresponding to the group Gr1.

In machine learning of mapping, user-related information that is information that can identify the tester, becomes input data, and evaluation information becomes teacher data. When the data that combines the input data and the teacher data is used as training data, the training data of each tester is prepared.

Figure 10:
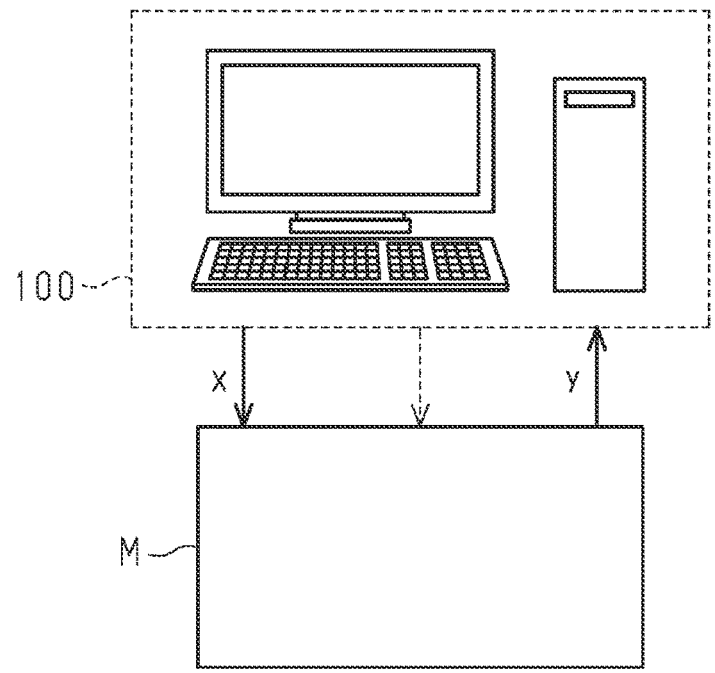
FIG. 10 is a schematic diagram showing how machine learning is applied to a map.

As shown in FIG. 10, a learning device 100 trains a mapping M using a plurality of the training data that is prepared in advance. That is, the learning device 100 inputs the input data to the mapping M as an input variable x.

In this case, in the mapping M, a first probability that the group to be selected is the group Gr1, a second probability that the group to be selected is the group Gr2, and a third probability that the group to be selected is the group Gr3 are derived. Then, among the first probability, the second probability, and the third probability, a value corresponding to the group corresponding to the highest probability is output. For example, when the first probability is the highest among the first probability, the second probability, and the third probability, the mapping M outputs a value corresponding to the group Gr1.

The learning device 100 acquires an output variable y output by the mapping M, and compares the output variable y with the actual evaluation information. Then, when the output variable y and the actual evaluation information are different, the learning device 100 adjusts various variables in a function approximator of the mapping M so that the probability of the group corresponding to the actual evaluation information is higher than the probability of the other groups. For example, when the output variable y and the actual evaluation information are different and the evaluation information is a value corresponding to the group Gr1, the device 100 adjusts various variables in the function approximator of the mapping M so that the first probability is higher than either the second probability or the third probability.

When the machine learning of the mapping M is completed, the mapping data DM defining the machine-learned mapping M is stored in the storage device 33 of the component selection device 30.

Vehicle Component Selection Method With reference to FIG. 11, a process flow for determining the transmission device 14 to be installed in the vehicle 10 by the component selection method of the present embodiment will be described.

In the first step S11 in the series of processes, the component selection device 30 acquires the user-related information. For example, information regarding a purchaser who decides to purchase the vehicle 10 at a dealer may be used as the user-related information. The information regarding the purchaser includes, for example, the age, the race, the nationality, and the residential area. Subsequently, in step S13, the component selection device 30 inputs the user-related information acquired in step S11 to the mapping M as input variables x(1) to x(n). That is, in the present embodiment, step S13 corresponds to an "input process".

In the next step S15, the component selection device 30 acquires the output variable y output from the mapping M. Then, in step S17, the component selection device 30 selects a group corresponding to the output variable y output by the mapping M from the groups Gr1, Gr2, Gr3. For example, when the output variable y is a value corresponding to the group Gr1, the component selection device 30 selects the group Gr1. That is, in the present embodiment, step S17 corresponds to a "selection process".

Subsequently, in step S19, the component selection device 30 determines the transmission device 14 categorized in the selected group as a component to be installed in the vehicle 10 for the user identified by the user-related information. That is, in the present embodiment, step S19 corresponds to a "determination process". Then, the component selection device 30 ends the series of processes.

Operations and Effects in Present Embodiment (1-1) In the present embodiment, the mapping M is machine-learned using the user-related information as shown in FIG. 7 and the evaluation information as shown in FIG. 8. When the machine learning of the mapping M is completed, the mapping data DM defining the mapping M is stored in the storage device 33 of the component selection device 30. Therefore, by causing the component selection device 30 to execute the input process, the selection process, and the determination process, it is possible to determine as the device to be installed in the vehicle 10 for the user identified by the user-related information input to the mapping M, the transmission device 14 in which the operation sound of the frequency range that the user feels uncomfortable about is less likely to be loud. By manufacturing the vehicle 10 in accordance with such a determination, it is possible to suppress the user from feeling uncomfortable about the operation sound of the transmission device 14 in the market.

(1-2) The frequency range of sounds the user feels sensitive about differs depending on the age, and the audible frequency range narrows due to aging. Thus, in the present embodiment, the user-related information includes information regarding the age of the user. That is, information regarding the age of the user is input to the mapping M as the input variable x. As a result, a value considering the age of the user is output from the mapping M as the output variable y. The group corresponding to the output variable y is selected from the groups Gr1, Gr2, Gr3. As a result, the transmission device 14 having characteristics considering the age of the user can be installed in the vehicle 10. The characteristic referred to here is a characteristic showing the relationship between the magnitude of the operation sound and the frequency range.

(1-3) The frequency range of sounds the user feels sensitive about differs depending on the race, and the audible frequency range differs depending on the race. Thus, in the present embodiment, the user-related information includes information regarding the race of the user. That is, information regarding the race of the user is input to the mapping M as the input variable x. As a result, a value considering the race of the user is output from the mapping M as the output variable y. The group corresponding to the output variable y is selected from the groups Gr1, Gr2, Gr3. As a result, the transmission device 14 having characteristics considering the race of the user can be installed in the vehicle 10.

(1-4) Depending on the area where the user resides, there may be more users who complain excessively that they feel uncomfortable about sounds in a specific frequency range as compared with other areas. In the present embodiment, the user-related information includes information regarding the nationality of the user and information regarding the area where the user resides. That is, the information regarding the nationality of the user and the information regarding the area where the user resides are input to the mapping M as the input variable x. As a result, a value considering the nationality of the user and the area where the user resides is output from the mapping M as the output variable y. The group corresponding to the output variable y is selected from the groups Gr1, Gr2, Gr3. Thereby, the transmission device 14 having characteristics considering the nationality of the user and the area where the user resides can be installed in the vehicle 10.

Second Embodiment

A second embodiment of the vehicle component selection method will be described. In the following description, the components that are different from the first embodiment will be mainly described, and the same or corresponding member configurations as those in the first embodiment are designated by the same reference numerals and duplicate explanations will be omitted.

Learning Method of Mapping M

Each tester HA, HB, HC, HD, . . . shown in FIG. 7 was subjected to a test for investigating the frequency range in which the sound is difficult to hear and the frequency range in which the sound is easy to hear. For example, the first sound of the frequency included in the high frequency range is heard by the testers HA, HB, HC, HD, . . . and the testers HA, HB, HC, HD, . . . were asked to determine whether the first sound is easy to hear. Similarly, the second sound of the frequency included in the middle frequency range is heard by the testers HA, HB, HC, HD, . . . and the testers HA, HB, HC, HD, . . . were asked to determine whether the second sound is easy to hear. Further, the third sound of the frequency included in the low frequency range is heard by the testers HA, HB, HC, HD, . . . and the testers HA, HB, HC, HD, . . . were asked to determine whether the third sound is easy to hear. Then, the testers HA, HB, HC, HD, . . . were asked to answer the sound that was the most difficult to hear among the first sound, the second sound, and the third sound.

Here, when the tester gets on the vehicle 10 which includes the transmission device 14 in which the operation sound in the frequency range that is easy to hear becomes loud, it can be presumed that the tester tends to feel uncomfortable about the operation sound of the transmission device 14. In contrast, when the tester gets on the vehicle 10 which includes the transmission device 14 in which the operation sound in the frequency range that is difficult to hear becomes loud, it can be presumed that the tester does not tend to feel uncomfortable about the operation sound of the transmission device 14.

Thus, for example, when the tester HA replies that the third sound is the most difficult to hear, it is assumed that the appropriate frequency range for the tester HA is the low frequency range. The "appropriate frequency range" here is the frequency range of the sound that is most difficult for the tester to hear. information regarding the results of such tests is referred to as "test information". In this case, the test information corresponds to information regarding the group in which the transmission device 14 having the characteristic that the operation sound in the frequency range that is difficult for the user to hear is louder than the operation sound in other frequency ranges is categorized.

In the present embodiment, such test information is adopted as the teacher data instead of the above evaluation information. For example, the test information of the tester for which the operation sound of the low frequency range is the most difficult to hear is set as the value corresponding to the group Gr3. For example, the test information of the tester for which the operation sound of the middle frequency range is the most difficult to hear is set as the value corresponding to the group Gr2. For example, the test information of the tester for which the operation sound of the high frequency range is the most difficult to hear is set as the value corresponding to the group Gr1.

In machine learning of the mapping M, the user-related information that is the information that can identify the tester, becomes the input data, and the test information becomes the teacher data. When the data that combines the input data and the teacher data is used as training data, the training data of each of the testers is prepared.

As shown in FIG. 10, the mapping M is learned using a plurality of the training data prepared in advance. That is, when the input data is input to the mapping M as the input variable x, the value corresponding to the input variable x is output from the mapping M as the output variable y. When this output variable y differs from the actual test information, various variables in the mapping M are adjusted. That is, in the present embodiment, the user-related information and the information regarding the group in which the transmission device 14 having a characteristic that the operation sound in the frequency range that the user identified by the user-related information does not feel uncomfortable is louder than the operation sound in the other frequency ranges is categorized are used to perform learning of the mapping M.

Then, the mapping data DM defining the mapping M learned in this way is stored in the storage device 33 of the component selection device 30.

Operations and Effects in Present Embodiment

In addition to the effects equivalent to the effects (1-2) to (1-4) in the first embodiment, the following effects can be further acquired.

(2-1) In the present embodiment, the mapping M is machine-learned using the user-related information as shown in FIG. 7 and the test information. The mapping data DM defining such mapping M is stored in the storage device 33 of the component selection device 30. Therefore, by causing the component selection device 30 to execute the input process, the selection process, and the determination process, it is possible to select as the device to be installed in the vehicle 10 for the user identified by the user-related information input to the mapping M, the transmission device 14 in which the operation sound of a predetermined frequency range is not louder than the operation sound of a frequency range that is difficult for the user to hear. The predetermined frequency range is a frequency range other than the frequency range that is difficult for the user to hear. Then, by installing the selected transmission device 14 in the vehicle 10, it is possible to prevent the user from feeling uncomfortable about the operation sound of the transmission device 14 installed in the vehicle 10 in the market.

Third Embodiment

A third embodiment of the vehicle component selection method will be described. In the following description, the components that are different from the above embodiments will be mainly described, and the same or corresponding member configurations as those in the above embodiments are designated by the same reference numerals and duplicate explanations will be omitted.

About Group

In the present embodiment, the transmission devices 14 of the same kind are categorized into the groups based on the relationship between the loudness of the operation sound and the frequency at which the operation sound is generated. For example, the transmission devices 14 of the same kind are categorized into two groups Gr11 and Gr12.

Fluid such as oil circulates in the transmission device 14. In the transmission device 14, when the temperature of the fluid changes, the relationship between the operation sound and the frequency in the transmission device 14 changes. The temperature of the fluid circulating in the transmission device 14 becomes higher as the operating time of the transmission device 14 becomes longer. The operating time of the transmission device 14 corresponds to the traveling time of the vehicle 10. That is, the longer the traveling time of the vehicle 10, the higher the fluid temperature tends to be.

FIG. 12 shows an example of a case where the relationship between the operation sound and the frequency changes as the traveling time of the vehicle 10 becomes longer. For example, among the groups Gr11 and Gr12, the transmission device 14 categorized into the group Gr11 has the following characteristics (B11) and (B12).

(B11) When the traveling time is relatively short and the fluid temperature is not so high, the operation sound of the middle frequency range is louder than the operation sound of the other frequency ranges. For example, when the traveling time is equal to or less than a first specified time, as shown by a solid line in FIG. 12, the operation sound of the middle frequency range becomes louder than the operation sound of the other frequency ranges.

(B12) When the traveling time becomes long and the fluid temperature becomes high, the frequency at which the operation sound is maximized moves to the high frequency side as shown by a white arrow in FIG. 12. When the traveling time exceeds the first specified time, as shown by a broken line in FIG. 12, the operation sound of the high frequency range becomes louder than the operation sound of the other frequency ranges.

On the other hand, for example, among the groups Gr11 and Gr12, the transmission device 14 categorized into the group Gr12 has the following characteristics (B21) and (B22). A second specified time shown below may be the same as the first specified time, or may be slightly different from the first specified time.

(B21) When the traveling time is relatively short and the fluid temperature is not so high, the operation sound of the high frequency range is louder than the operation sound of the other frequency ranges. For example, when the traveling time is not more than the second specified time, as shown by the broken line in FIG. 12, the operation sound in the high frequency range becomes louder than the operation sound in the other frequency ranges.

(B22) When the traveling time becomes long and the fluid temperature becomes high, the frequency at which the operation sound is maximized moves to the low frequency side as shown by the white arrow drawn by a broken line in FIG. 12. When the traveling time exceeds the second specified time, as shown by the solid line in FIG. 12, the operation sound of the middle frequency range becomes louder than the operation sound of the other frequency ranges.

That is, in the present embodiment, the group Gr11 corresponds to a "first group", and the high frequency range corresponds to a "first frequency range". Further, the group Gr12 corresponds to a "second group", and the middle frequency range corresponds to a "second frequency range".

Learning Method of Mapping M

In the present embodiment, as shown in FIG. 13, the user-related information includes information regarding an average value of a traveling time of the vehicle 10 of each of the testers HA, HB, HC, HD, . . . in addition to the information that can identify the tester as shown in FIG. 7. The average value of the traveling time referred to here is the average value of the traveling time of the vehicle in one trip when the testers HA, HB, HC, HD, . . . drive the vehicles owned by themselves. In FIG. 13, the average value of the traveling time of the tester HA is "TM1", and the average value of the traveling time of the tester HB is "TM2". Further, the average value of the traveling time of the tester HC is "TM3", and the average value of the traveling time of the tester HD is "TM4".

For example, a user who is less likely to feel uncomfortable about the sound in the high frequency range than the sound in the other frequency ranges and who has a relatively short average traveling time of the vehicle 10 is defined as a first user. At this time, it is preferable that the vehicle 10 for the first user be equipped with the transmission device 14 categorized into the group Gr11 rather than the group Gr12. This is because when the first user drives the vehicle 10, the traveling distance is often not long. By installing the transmission device 14 categorized in the group Gr11 in the vehicle 10, when the first user is driving the vehicle 10, opportunities in which the operation sound of the high frequency range is the largest among the operation sounds of the transmission device 14 are not that many.

For example, a user who is less likely to feel uncomfortable about the sound in the high frequency range than the sound in the other frequency ranges and who has a relatively long average traveling time of the vehicle 10 is defined as a second user. At this time, it is preferable that the vehicle 10 for the second user be equipped with the transmission device 14 categorized into the group Gr12 rather than the group Gr11. This is because when the second user drives the vehicle 10, the traveling distance is often long. By installing the transmission device 14 categorized in the group Gr12 in the vehicle 10, when the second user is driving the vehicle 10, opportunities in which the operation sound of the middle frequency range is the largest among the operation sounds of the transmission device 14 are increased.

Then, in the machine learning of the mapping M, the user-related information including the information that can identify the tester and the information regarding the average value of the traveling time, shown in FIG. 13, is used. Further, in machine learning, the evaluation information described in the first embodiment or the test information described in the second embodiment is used. That is, the user-related information becomes the input data, and the evaluation information or test information becomes the teacher data. When the data that combines the input data and the teacher data is used as training data, the training data of each of the testers is prepared.

Vehicle Component Selection Method

Figure 11:
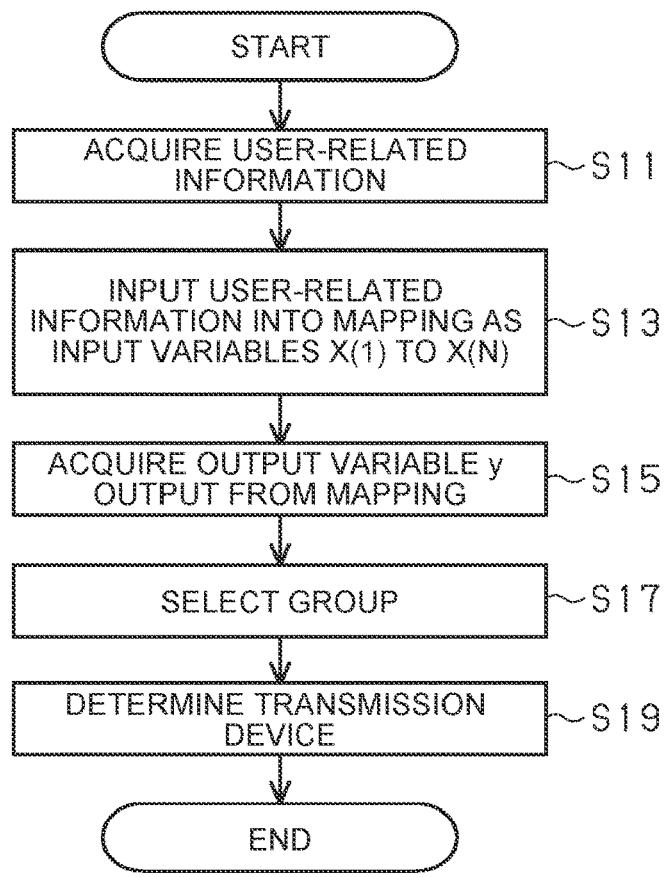
FIG. 11 is a flowchart showing a flow of each process in the component selection method of the first embodiment.

In the first step S11 in the series of processes shown in FIG. 11, the component selection device 30 acquires the user-related information. In the present embodiment, for example, the information that can identify the purchaser who has decided to purchase the vehicle 10 at the dealer and an estimated value of the traveling time of the vehicle 10 by the purchaser may be used as the user-related information. The estimated value of the traveling time of the vehicle 10 by the purchaser can be derived, for example, by acquiring the data of the vehicle owned by the purchaser in the past.

Subsequently, in step S13, the component selection device 30 inputs the user-related information acquired in step S11 to the mapping M as input variables x(1) to x(n). Since the subsequent process flow is the same as in each of the above embodiments, detailed description thereof will be omitted.

Operations and Effects in Present Embodiment

In the present embodiment, in addition to the same effects as the effects in each of the above embodiments, the following effects can be further obtained.

(3-1) In the present embodiment, the user-related information including the information regarding the age of the user, the information regarding the race, the information regarding the area where the user resides, and the information regarding the estimated value of the traveling time of the vehicle 10 by the user is input to the mapping M as the variable x. In this case, the mapping M outputs a value considering the age of the user, the race of the user, the area where the user resides, and the estimated value of the traveling time as the output variable y.

Here, it is assumed that the user identified by the user-related information is, for example, a user who feels that the operation sound in the high frequency range is more uncomfortable than the operation sound in the other frequency ranges, and whose estimated value of the traveling time of the vehicle 10 is relatively short. In this case, by inputting the user-related information in the mapping M, the value corresponding to the group Gr11 among the groups Gr11 and Gr12 may be output from the mapping M as the output variable y. When the value corresponding to the group Gr11 is output from the mapping M as the output variable y, the transmission device 14 categorized in the group Gr11 can be determined as a component to be installed in the vehicle 10.

Therefore, by selecting the group in consideration of the traveling time of the vehicle 10 when the user identified by the user-related information uses the vehicle 10, it is possible to suppress the user from feeling uncomfortable with the operation sound of the transmission device 14 when the vehicle is used.

Fourth Embodiment

A fourth embodiment of the vehicle component selection method will be described. In the following description, the components that are different from the above embodiments will be mainly described, and the same or corresponding member configurations as those in the above embodiments are designated by the same reference numerals and duplicate explanations will be omitted.

About Group

In the present embodiment, the transmission devices 14 of the same kind are categorized into the groups based on the relationship between the loudness of the operation sound and the frequency at which the operation sound is generated. For example, the transmission devices 14 of the same kind are categorized into two groups Gr21 and Gr22.

The operation mode of the transmission device 14 changes depending on the vehicle speed. When the operation mode changes, the relationship between the operation sound and the frequency in the transmission device 14 changes. For example, it is assumed that the transmission device 14 has a stepped speed change mechanism. In this case, when a gear stage of the transmission device 14 is changed, a power transmission path inside the transmission device 14 changes. As a result, a generation mode of the operation sound of the transmission device 14 changes. Further, the shift stage of the transmission device 14 is variable in accordance with a change in vehicle speed. Thus, the frequency range in which the operation sound of the transmission device 14 is maximized may change depending on the vehicle speed.

Figures 14, 15:
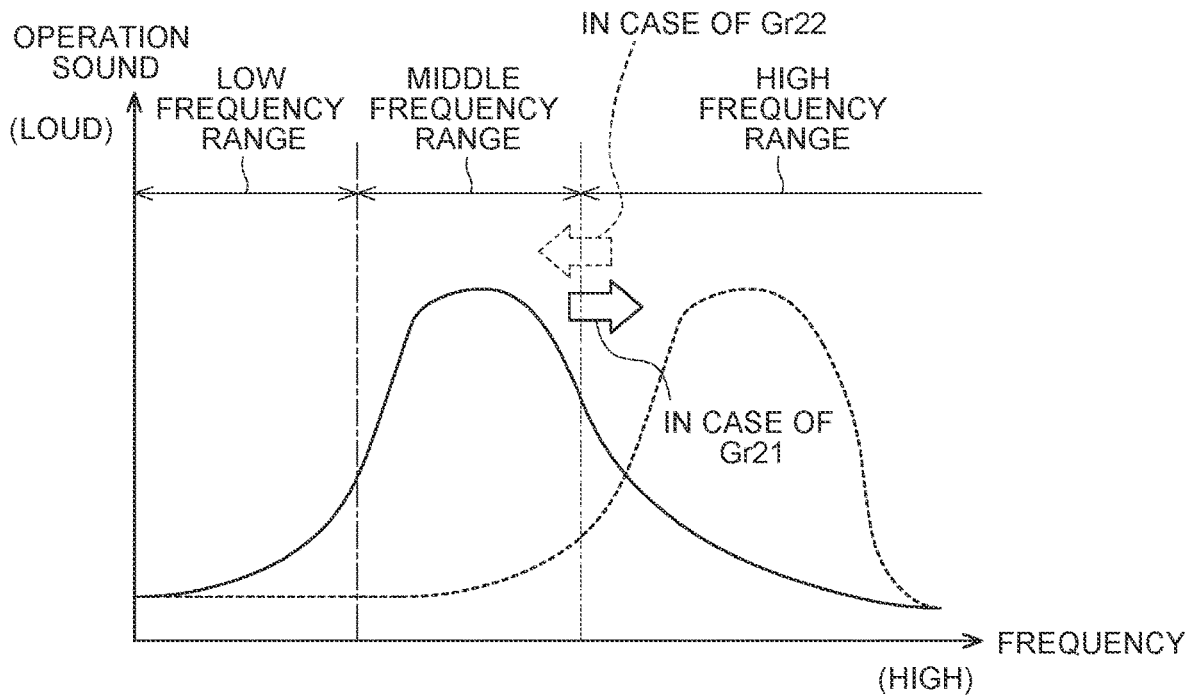
FIG. 14 is a diagram showing how the relationship between the operation sound and the frequency of the transmission device changes in accordance with a vehicle speed in a fourth embodiment.
FIG. 15 is a table showing information regarding the testers.

FIG. 14 shows an example of a case where the relationship between the operation sound and the frequency changes depending on the vehicle speed. For example, the transmission device 14 categorized into the group Gr21 among the groups Gr21 and Gr22 has the following characteristics (C11) and (C12).

(C11) When the vehicle speed is relatively low, the operation sound of the middle frequency range is louder than the operation sound of the other frequency ranges. For example, when the vehicle speed is equal to or lower than a first specified vehicle speed, as shown by a solid line in FIG. 14, the operation sound in the middle frequency range is louder than the operation sound in the other frequency ranges.

(C12) When the vehicle speed increases, the frequency at which the operation sound is maximized shifts to the high frequency side, as shown by the white arrow drawn by a solid line in FIG. 14. When the vehicle speed exceeds the first specified vehicle speed, the operation sound of the high frequency range becomes louder than the operation sound of the other frequency ranges, as shown by a broken line in FIG. 14.

In contrast, for example, the transmission device 14 categorized into the group Gr22 among the groups Gr21 and Gr22 has the following characteristics (C21) and (C22). The second specified vehicle speed shown below may be the same as the first specified vehicle speed, or may be slightly different from the first specified vehicle speed.

(C21) When the vehicle speed is relatively low, the operation sound of the high frequency range is louder than the operation sound of the other frequency ranges. For example, when the vehicle speed is equal to or lower than the second specified vehicle speed, the operation sound of the high frequency range is louder than the operation sound of the other frequency range, as shown by the broken line in FIG. 14.

(C22) As the vehicle speed increases, the frequency at which the operation sound is maximized shifts to the low frequency side, as shown by the white arrow drawn by a broken line in FIG. 14. When the vehicle speed exceeds the second specified vehicle speed, the operation sound in the middle frequency range becomes louder than the operation sound in the other frequency ranges, as shown by the solid line in FIG. 14.

That is, in the present embodiment, the group Gr21 corresponds to the "first group", and the high frequency range corresponds to the "first frequency range". Further, the group Gr22 corresponds to the "second group", and the middle frequency range corresponds to the "second frequency range".

Learning Method of Mapping M

In the present embodiment, as shown in FIG. 15, the user-related information includes the information regarding the vehicle speed region mainly used by the testers HA, HB, HC, HD, . . . , in addition to the information that can identify the user as shown in FIG. 7. In FIG. 15, the main vehicle speed region of the tester HA is "Fsp1", and the main vehicle speed region of the tester HB is "Fsp2". Further, the main vehicle speed region of the tester HC is "Fsp3", and the main vehicle speed region of the tester HD is "Fsp4".

For example, the first user is a user who is less likely to feel uncomfortable about the sound of the high frequency range than the sound of the other frequency ranges and who has a relatively low main vehicle speed range. At this time, it is preferable that the vehicle 10 for the first user is equipped with the transmission device 14 categorized into the group Gr21 rather than the group Gr22. This is because when the first user drives the vehicle 10, the vehicle speed is rarely increased. By installing the transmission device 14 categorized in the group Gr21 in the vehicle 10, when the first user is driving the vehicle 10, opportunities in which the operation sound of the high frequency range is the largest among the operation sounds of the transmission device 14 are not that many.

For example, the second user is a user who is less likely to feel uncomfortable about the sound of the high frequency range than the sound of the other frequency ranges and a user who has a relatively high main vehicle speed range. At this time, it is preferable that the vehicle 10 for the second user is equipped with the transmission device 14 categorized into the group Gr22 rather than the group Gr21. This is because when the second user drives the vehicle 10, there are many opportunities in which the vehicle 10 travels at a high vehicle speed. By installing the transmission device 14 categorized in the group Gr22 in the vehicle 10, opportunities in which the operation sound of the middle frequency range is the largest among the operation sounds of the transmission device 14 are increased.

In the machine learning of the mapping M, the user-related information shown in FIG. 15 including the information that can identify the tester and the information regarding the main vehicle speed region are used. Further, in machine learning, the evaluation information described in the first embodiment or the test information described in the second embodiment is used. That is, the user-related information becomes the input data, and the evaluation information or test information becomes the teacher data. When the data that combines the input data and the teacher data is used as training data, the training data of each tester is prepared.

Vehicle Component Selection Method

In the first step S11 in the series of processes shown in FIG. 11, the component selection device 30 acquires the user-related information. In the present embodiment, for example, it is preferable that the information that can identify the purchaser who has decided to purchase the vehicle 10 at the dealer and information regarding an estimated value of the range of the vehicle speed most used when the purchaser's vehicle 10 is used be used as the user-related information. The estimated value of the range of the vehicle speed most used can be derived, for example, by acquiring the data of the vehicle owned by the purchaser in the past.

Subsequently, in step S13, the component selection device 30 inputs the user-related information acquired in step S11 to the mapping M as input variables x(1) to x(n). Since the subsequent process flow is the same as in each of the above embodiments, detailed description thereof will be omitted.

Operations and Effects in Present Embodiment

In the present embodiment, in addition to the same effects as the effects in each of the above embodiments, the following effects can be further obtained.

(4-1) In the present embodiment, the user-related information including the information regarding the age of the user, the information regarding the race, the information regarding the area where the user resides, and the information regarding the estimated value of the vehicle speed range most used by the user is input to the mapping M as the variable x. In this case, the mapping M outputs a value considering the age of the user, the race of the user, the area where the user resides, and the estimated value of the most used vehicle speed range as the output variable y.

Here, it is assumed that the user identified by the user-related information is, for example, a user who feels that the operation sound of the high frequency range is more uncomfortable than the operation sound of the other frequency ranges, and whose most used vehicle speed range is relatively low. In this case, by inputting the user-related information in the mapping M, the value corresponding to the group Gr21 among the groups Gr21 and Gr22 may be output from the mapping M as the output variable y. When the value corresponding to the group Gr21 is output from the mapping M as the output variable y, the transmission device 14 categorized in the group Gr21 can be determined as a component to be installed in the vehicle 10.

Thus, by selecting the group in consideration of the range of the vehicle speed most used by the user identified by the user-related information, it is possible to suppress the user from feeling uncomfortable about the operation sound of the transmission device 14 when using the vehicle.

Modifications

Each of the embodiments described above can be modified and implemented as follows. Each of the embodiments described above and modifications described below may be carried out in combination within a technically consistent range.

Information Used for Machine Learning of Mapping M

In each of the above embodiments, the following information may be used when machine learning of the mapping M is performed. For example, when a complaint is made about the operation sound generated from the vehicle 10, the information regarding the user who made the complaint and the frequency range of the operation sound are acquired. The operation sound of such a frequency range is a sound that is uncomfortable to the user. Thus, it can be assumed that the operation sound of a frequency range other than such a frequency range is a sound that is less likely to be uncomfortable to the user. Therefore, it is preferable to adopt the information acquired in this way as the training data.

About Input Variable x

The user-related information input as the input variable x in the mapping M does not have to include other information as long as it contains information regarding the age of the user. For example, the user-related information does not need to include information regarding the race. In addition, the user-related information does not need to include information regarding the nationality, and does not need to include information regarding the area in which the user resides.

The user-related information input as the input variable x in the mapping M does not have to include other information as long as it contains information regarding the race of the user. For example, the user-related information does not need to include information regarding the age. In addition, the user-related information does not need to include information regarding the nationality, and does not need to include information regarding the area in which the user resides.

The user-related information input as the input variable x in the mapping M does not need to include other information as long as it includes information regarding the nationality or the information regarding the residential area. For example, the user-related information does not need to include information regarding the age. In addition, the user-related information does not need to include information regarding the race.

The user-related information input to the mapping M as the input variable x may include information other than information regarding the age of the user, the information regarding the race, and the information regarding the area where the user resides. For example, other information may include information regarding the gender of the user.

About Group

In the first embodiment and the second embodiment described above, the number of groups in which the transmission devices 14 are categorized does not have to be "three" as long as it is "two" or more.

In the third embodiment described above, the number of groups in which the transmission devices 14 are categorized may be "three" or more. For example, the transmission devices 14 categorized into groups other than the groups Gr11 and Gr12 have the following characteristics (B31) and (B32). A third specified time may be the same as the first specified time described above, or may be slightly different from the first specified time.

(B31) When the traveling time is relatively short and a fluid temperature is not so high, the operation sound of the low frequency range is louder than the operation sound of the other frequency ranges. For example, when the traveling time is equal to or less than the third specified time, the operation sound of the low frequency range becomes louder than the operation sound of the other frequency ranges.

(B32) When the traveling time becomes long and the fluid temperature becomes high, the frequency at which the operation sound is maximized moves to the high frequency side. When the traveling time exceeds the third specified time, the operation sound of the middle frequency range becomes louder than the operation sound of the other frequency ranges.

In the fourth embodiment, the number of groups in which the transmission devices 14 are categorized may be "three" or more. For example, the transmission devices 14 categorized into groups other than the groups Gr21 and Gr22 have the following characteristics (C31) and (C32). A third specified vehicle speed may be the same as the first specified vehicle speed described above, or may be slightly different from the first specified vehicle speed.

(C31) When the vehicle speed is relatively low, the operation sound of the low frequency range is louder than the operation sound of the other frequency ranges. For example, when the vehicle speed is equal to or lower than the third specified vehicle speed, the operation sound of the low frequency range is louder than the operation sound of the other frequency ranges.

(C32) As the vehicle speed increases, the frequency at which the operation sound is maximized shifts to the high frequency side. When the vehicle speed exceeds the third specified vehicle speed, the operation sound of the middle frequency range becomes louder than the operation sound of the other frequency ranges.

About Component Selection Device 30

The component selection device 30 is not limited to a device that includes the CPU 31 and the ROM 32 and that executes software processing. For example, the execution device may include a dedicated hardware circuit that executes hardware processes in place of at least part of the software processes executed in each of the above embodiments. As a dedicated hardware circuit, for example, an application specific integrated circuit (ASIC) can be applied. ASIC is an abbreviation for "application specific integrated circuit". That is, the component selection device 30 only needs to have one of the following configurations (a) to (c):

(a) the component selection device 30 includes a processing device that executes all of the above processes according to a program and a program storage device such as a ROM for storing the program;

(b) the component selection device 30 includes a processing device that executes part of the above processes according to a program, a program storage device, and a dedicated hardware circuit that executes the remaining processes; and (c) the component selection device 30 includes a dedicated hardware circuit that executes all of the above processes. Here, the above configurations may have a plurality of software execution devices including a processing device and a program storage device and a plurality of dedicated hardware circuits.

About Transmission Device 14

The transmission device 14 may have a configuration other than the device provided with the stepped speed change mechanism. For example, the transmission device 14 may be a device including a stepless speed change mechanism.

About Driving Force transmitting component

When the vehicle 10 is a hybrid electric vehicle including an internal combustion engine and an electric motor as a power source, the driving force transmitting component may be a device including a planetary gear mechanism.

The driving force transmitting component may be a component other than the transmission device 14 as long as it is a component arranged in the power transmission path. For example, the driving force transmitting component may be the differential device 15 or the torque converter 13.

About Vehicle

The vehicle 10 may be a hybrid electric vehicle including an internal combustion engine and an electric motor as the power source 12. The vehicle 10 may be an electrified vehicle including only the electric motor as the power source 12 among the electric motor and the internal combustion engine.

What is claimed is:

1. A vehicle component selection method that selects a driving force transmitting component to be installed in a vehicle, wherein the driving force transmitting component is arranged in a power transmission path from a power source of the vehicle to drive wheels, wherein a plurality of the driving force transmitting components of the same kind is categorized into a plurality of groups in accordance with a frequency range in which an operation sound is the loudest, wherein a component selection device stores mapping data that is data that defines mapping learned by machine learning, wherein the mapping uses, as an input variable, user-related information that is information regarding a user, and when the input variable is input, the mapping outputs a value corresponding to the input variable as an output variable, wherein the output variable is a value that identifies a group in which the driving force transmitting component is categorized among the groups, the driving force transmitting component having a characteristic in which an operation sound of another frequency range is louder than an operation sound of a frequency range that the user identified by the user-related information feels most uncomfortable about, and wherein the component selection device is caused to execute an input process that inputs the user-related information into the mapping as the input variable, a selection process that selects the group corresponding to the output variable output by the mapping from the groups, and a determination process that determines the driving force transmitting component categorized into the group selected in the selection process as a component to be installed in the vehicle for the user identified by the user-related information.

2. The vehicle component selection method according to claim 1,
wherein the user-related information includes at least one of information regarding an age of the user, information regarding a race, and information regarding an area where the user resides, and
wherein in the input process, the user-related information is input to the mapping.

3. The vehicle component selection method according to claim 1,
wherein machine learning is performed for the mapping by using the user-related information and information regarding the group in which the driving force transmitting component is categorized, the driving force transmitting component having a characteristic in which an operation sound of a frequency range that the user identified by the user-related information does not feel uncomfortable about is louder than the operation sound of another frequency range, and
wherein in the input process, the user-related information is input to the mapping.

4. The vehicle component selection method according to claim 1,
wherein machine learning is performed for the mapping by using the user-related information and information regarding the group in which the driving force transmitting component is categorized, the driving force transmitting component having a characteristic in which an operation sound of a frequency range that the user identified by the user-related information has difficulty hearing is louder than the operation sound of another frequency range, and
wherein in the input process, the user-related information is input to the mapping.

5. The vehicle component selection method according to claim 1,
wherein among the groups,
in the driving force transmitting component categorized into a first group, when a traveling time of the vehicle exceeds a first specified time, an operation sound of a first frequency range is louder than when the traveling time is less than or equal to the first specified time, and an operation sound of a second frequency range is smaller than when the traveling time is less than or equal to the first specified time, and
in the driving force transmitting component categorized into a second group, when the traveling time of the vehicle exceeds a second specified time, the operation sound of the second frequency range is louder than when the traveling time is less than or equal to the second specified time, and the operation sound of the first frequency range is smaller than when the traveling time is less than or equal to the second specified time,
wherein the user-related information includes at least one of information regarding an age of the user, information regarding a race, and information regarding an area where the user resides, and includes information regarding an estimated value of a traveling time of the vehicle of the user, and
wherein in the input process, the user-related information is input to the mapping.

6. The vehicle component selection method according to claim 1,
wherein among the groups,
in the driving force transmitting component categorized into a first group, when a vehicle speed is higher than a first specified vehicle speed, an operation sound of a first frequency range is louder than when the vehicle speed is less than or equal to the first specified vehicle speed, and an operation sound of a second frequency range is smaller than when the vehicle speed is less than or equal to the first specified vehicle speed, and
in the driving force transmitting component categorized into a second group, when the vehicle speed is lower than or equal to a second specified vehicle speed, the operation sound of the second frequency range is louder than when the vehicle speed is higher than the second specified vehicle speed, and the operation sound of the first frequency range is smaller than when the vehicle speed is less than or equal to the second specified vehicle speed,
wherein the user-related information includes at least one of information regarding an age of the user, information regarding a race, and information regarding an area where the user resides, and includes information regarding an estimated value of a vehicle speed range most used when the user uses the vehicle, and
wherein in the input process, the user-related information is input to the mapping.

* * * * *